United States Patent
Wan et al.

(10) Patent No.: US 7,398,231 B2
(45) Date of Patent: Jul. 8, 2008

(54) ONLINE WARDROBE

(75) Inventors: Dadong Wan, Palatine, IL (US);
Anatole V. Gershman, Chicago, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 11/685,286

(22) Filed: Mar. 13, 2007

(65) Prior Publication Data
US 2007/0179916 A1    Aug. 2, 2007

Related U.S. Application Data

(62) Division of application No. 09/798,232, filed on Mar. 2, 2001, now Pat. No. 7,194,428.

(51) Int. Cl.
*G06Q 30/00*    (2006.01)

(52) U.S. Cl. .......................... 705/26; 705/27

(58) Field of Classification Search ................ None
See application file for complete search history.

(56) References Cited

U.S. PATENT DOCUMENTS

| | | | |
|---|---|---|---|
| 4,697,713 A | 10/1987 | Pryor | |
| 5,551,021 A | 8/1996 | Harada et al. | |
| 5,680,528 A | 10/1997 | Korszun | |
| 5,732,401 A | 3/1998 | Conway | |
| 5,850,222 A | 12/1998 | Cone | |
| 5,930,769 A | 7/1999 | Rose | |
| 6,206,750 B1 | 3/2001 | Barad et al. | |
| 6,307,568 B1 * | 10/2001 | Rom | 345/629 |
| 6,313,745 B1 * | 11/2001 | Suzuki | 340/572.1 |
| 6,661,433 B1 * | 12/2003 | Lee | 715/764 |
| 6,701,207 B1 | 3/2004 | Gazzuolo | |
| 6,766,947 B2 * | 7/2004 | Wan et al. | 235/383 |
| 6,793,127 B2 | 9/2004 | Alsafadi et al. | |
| 7,089,216 B2 * | 8/2006 | Van Overveld | 706/12 |
| 7,194,428 B2 * | 3/2007 | Wan et al. | 705/26 |

FOREIGN PATENT DOCUMENTS

EP    0568103 A2 * 11/1993

OTHER PUBLICATIONS

AIM (Automatic Identification Manufacturers), "Radio Frequency Identification—RFID, A Basic Primer," Sep. 28, 1999, pp. 1-20, http://www.aimglobal.org/technologies/rfid/resources/papers/rfid_basics_primer.htm.

(Continued)

*Primary Examiner*—F. Zeender
*Assistant Examiner*—Christopher Buchanan
(74) *Attorney, Agent, or Firm*—Banner & Witcoff, Ltd.

(57) ABSTRACT

A wardrobe closet that assists users in selecting and purchasing clothing is provided. A radio frequency receiver scans tags embedded in clothing to identify the clothing. When a user removes an article of clothing from the wardrobe closet, the wardrobe closet suggests other articles of clothing that match the removed article of clothing. The wardrobe closet may also be connected to websites via the Internet. The wardrobe closet may determine the user's clothing needs and find clothing offered for sale at one or more web sites. The user is then allowed to purchase the clothing.

20 Claims, 8 Drawing Sheets

OTHER PUBLICATIONS

AIM (Automatic Identification Manufacturers), "What is Radio Frequency Identification (RFID)?" Aug. 8, 2001, pp. 1-3, http://www.aimglobal.org/technologies/rfid/what_is_rfid.htm.

AIM (Automatic Identification Manufacturers), "Glossary of Radio Frequency Identification (RFID) Terms," Jul. 1994, pp. 1-10, http://www.aimglobal.org/technologies/rfid/resources/papers/rfid_glossary_of_terms.htm.

AIM Frequency Forums, "Draft Paper on the Characteristics of RFID-Systems," Jul. 2000, pp. 1-23, version 1.0.

Wan, Dadong, "Magic Wardrobe: Situated Shopping from your own Bedroom," Personal Technologies, 2000, pp. 234-237, Springer-Verlag, London, UK.

Gershman, Anatole V. et al. "Situated Computing: Bridging the Gap Between Intention and Action," Proceedings of the Third International Symposium on Wardrobe Computing, 1999, pp. 1-7.

Jones, Gareth J.F. et al. "Information Access for Context-Aware Appliances," 2000, pp. 382-384.

* cited by examiner

ONLINE WARDROBE

This application is a divisional patent application of common-owned, U.S. application Ser. No. 09/798,232 ("ONLINE WARDROBE") filed on Mar. 2, 2001 now U.S. Pat. No. 7,194,428 naming Wan, et al., the entire disclosure of which is hereby incorporated by reference.

FIELD OF THE INVENTION

This invention relates generally to wardrobe closets. More particularly, the invention provides methods and systems for managing a person's wardrobe with a computer system connected to the Internet.

BACKGROUND OF THE INVENTION

Typical wardrobe closets merely provide a mechanism for storing a person's clothing. When selecting clothing, a person must search through the wardrobe closet and gather separate articles of clothing to forma coordinated outfit. Often times some articles of clothing may be stored in a portion of the wardrobe closet that make it unlikely that the user will select those articles of clothing. Furthermore, it is often difficult for a person to remember the characteristics of every article of clothing they have stored in their wardrobe closet. As a result, it is difficult to maximize the number of coordinated outfits they can be assembled from a person's clothing inventory.

When shopping in clothing stores, shoppers often look at a new article of clothing and try to determine whether or not the new article of clothing will form a coordinated outfit with one or more of the shopper's existing articles of clothing. Unfortunately, the shoppers are forced to try to remember characteristics like the colors and textures of their existing clothing before making a purchasing decision. This imperfect process often results in a shopper returning a purchased article of clothing after seeing the article of clothing next to one or more other articles of clothing.

Therefore, there exists a need in the art for a system that assists the user in managing the user's clothing inventory and facilitates adding additional articles of clothing to the user's clothing inventory.

SUMMARY OF THE INVENTION

The present invention provides a wardrobe closet that assists users in selecting and purchasing clothing. The wardrobe closet allows the user to conveniently and efficiently manage the user's clothing inventory.

In one embodiment, the advantages of the present invention are realized by a method of aiding a user in the selection of clothing. The method includes the steps of automatically identifying clothing stored in a wardrobe closet and automatically identifying a first piece of clothing that has been removed from the wardrobe closet. Next, the wardrobe closet automatically determines a second piece of clothing that is appropriate to wear with the first piece of clothing. An identification of the second piece of clothing is presented to the user.

In another embodiment, a method of aiding a user in the selection of clothing is provided. The method includes the steps of storing a user's schedule of appointments in a memory and automatically identifying clothing that has been removed from a wardrobe closet. A software algorithm is executed to determine whether the clothing is appropriate to wear to the appointments included in the user's schedule of appointments. The user is alerted when the clothing that has been removed from the wardrobe closet is not appropriate to wear to the appointments included in the user's schedule of appointments.

In yet another embodiment of the invention, a method of identifying clothing at a store that may be of interest to a consumer is provided. The method includes the steps of receiving information identifying clothing owned by the consumer and identifying clothing offered for sale by the store. Next clothing that may be of interest to the consumer is identified. A representation of the clothing that may be of interest to the consumer is then displayed.

An embodiment that includes a wardrobe closet that identifies clothing and transmits information to a wide area network is also provided. The wardrobe closet includes a radio frequency receiver configured to read information included on radio frequency sensitive tags attached to clothing. A computer is coupled to the radio frequency receiver and a wide area network and is configured to transmit information to the wide area network and receive information from additional computers coupled to the wide area network. The wardrobe closet also includes a display device coupled to the computer that displays clothing information to a user.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
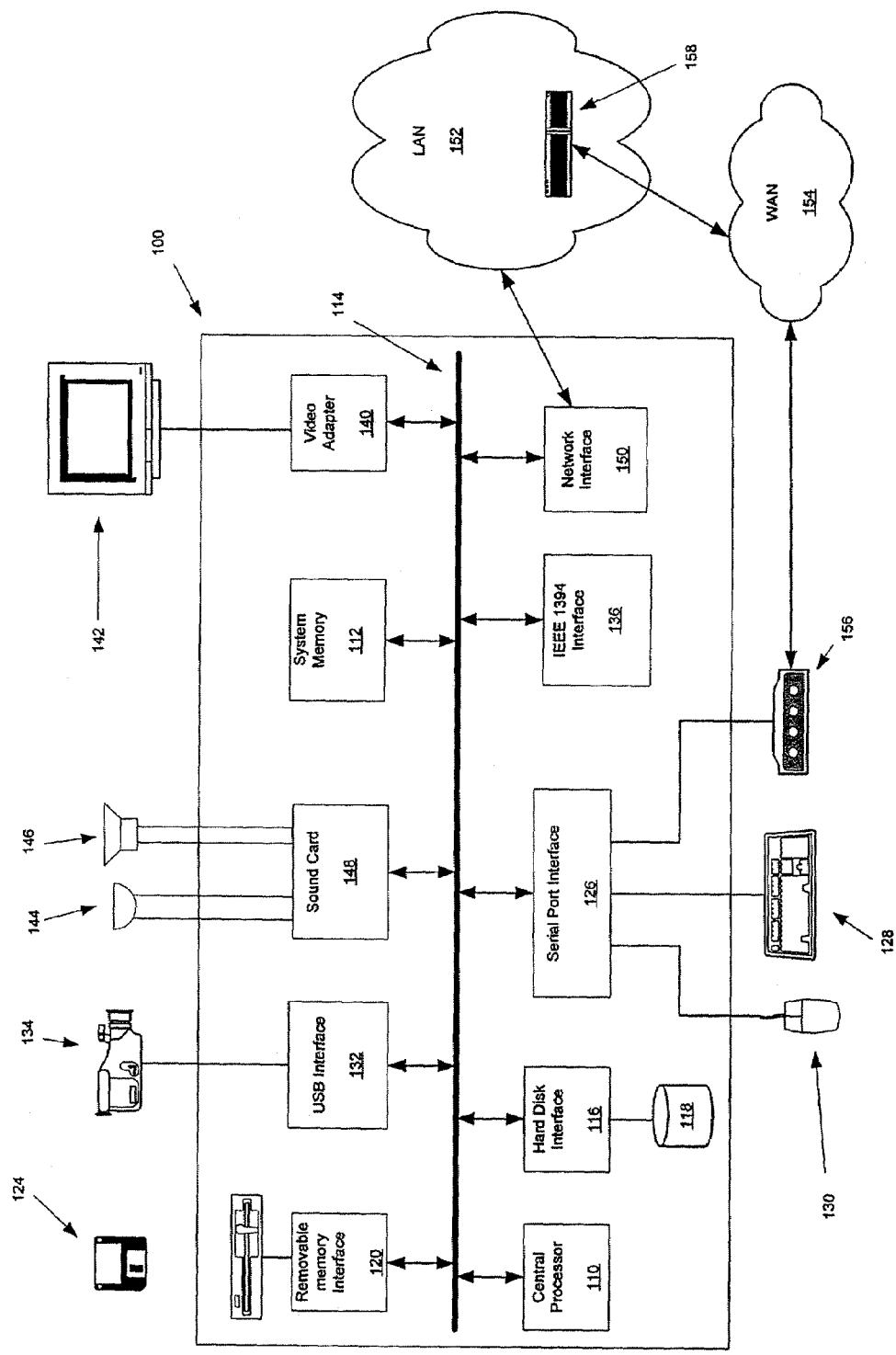
FIG. 1 shows a typical prior art workstation and communication connections.

Elements of the present invention may be implemented with computer systems, such as the system 100 shown in FIG. 1. Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Figure 2:
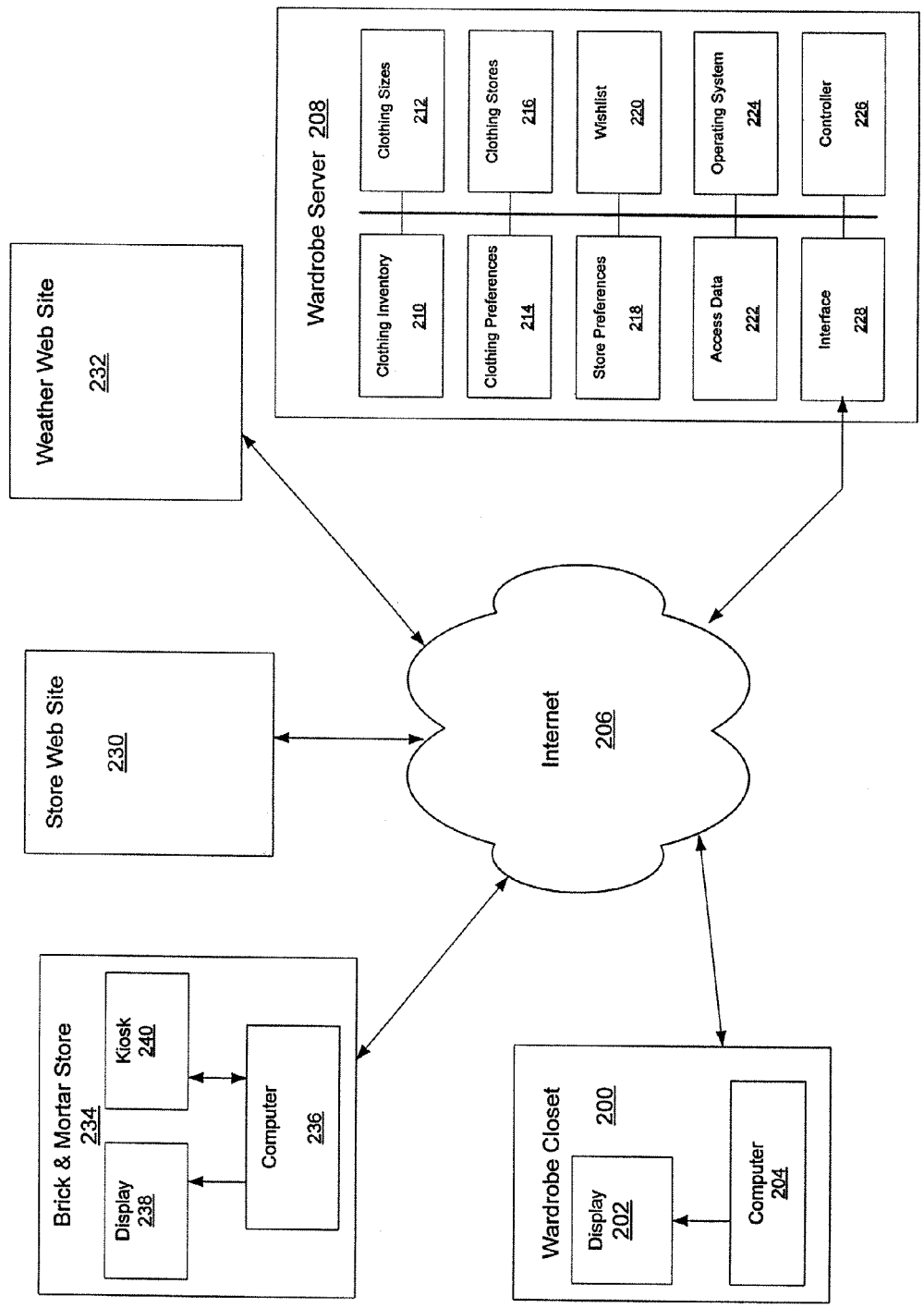
FIG. 2 illustrates a computer network system they can be used to select and purchase clothing in accordance with an embodiment of the invention.

FIG. 2 illustrates a system for managing clothing in accordance with an embodiment of the invention. A wardrobe closet 200 includes a computer 204, a display 202 and may be connected to a wide area network, such as the Internet 206. The structure of wardrobe closet 200 will be described in greater detail with reference to FIG. 3. Furthermore, the operation of wardrobe closet 200 and the remaining elements shown in FIG. 2 will be described in greater detail with reference to FIGS. 4-7.

Wardrobe closet 200 may store and transmit information relating to the clothing owned and acquired by a user. In one embodiment of the invention, the information is transmitted through the Internet 206 to a wardrobe server 208. Wardrobe server 208 may store information for variety of different users and may be implemented with a variety of conventional components. Wardrobe server 208 includes a clothing inventory memory module 210 that may be used to store a user's clothing information. The user's clothing sizes may be stored in a clothing sizes memory module 212 and the user's clothing preferences may be stored in a clothing preference module 214. Additional clothing information may also be stored in wardrobe server 208. For example the identification of clothing stores may be stored in clothing store memory module 216 and a user's favorite stores may be stored in store preference memory module 218. Clothing that the user wishes to purchase in the future may be stored in a wish list memory module 220.

Access to wardrobe server 208 may be controlled by information contained in access data module 222. A variety of different methods may be used to control access to wardrobe server 208. In one embodiment of the invention, the user is required to enter a personal identification number (PIN) before accessing wardrobe server 208. In another embodiment of the invention, an access code is read from a smart card to permit access to wardrobe server 208. The overall operation of wardrobe server 208 may be governed by an operating system program 224 in conjunction with a controller 226. Operating system program 224 and controller 226 may be implemented with a variety of conventional programs and electronic components that are well-known to those skilled in the art. Wardrobe server 208 also includes an interface 228, such as a modem, that allows wardrobe server 208 to communicate with the Internet 206.

FIG. 2 illustrates an embodiment in which wardrobe server 208 is separated from wardrobe closet 200. Of course, one or more of the components shown in wardrobe server 208 may be included in wardrobe closet 200. Wardrobe server 208 may also be hosted by a trusted third party. A fee may be required when parties such as brick & mortar store 234 and store web site 230 retrieve information from wardrobe server 208. The fee may be a one time fee that retailers pay to be part of the network, a fee based on the amount information retrieved, or a fee based on other factors.

A variety of websites may be connected to Internet 206. FIG. 2 shows a store web site 230 that allows consumers to purchase clothing online. A weather web site 232 is also shown. Weather web site 232 may provide information to wardrobe closet 200 to aid in the selection of clothing in a manner that will be described in detail below. Of course, numerous additional websites may also be included to allow users to purchase clothing and obtain information. In addition to websites, the system shown in FIG. 2 also includes a brick and mortar store 234. Brick and mortar store 234 may include a computer 236, a display 238 and a kiosk 240. The operation of these components will be in described in detail below.

Figure 3:
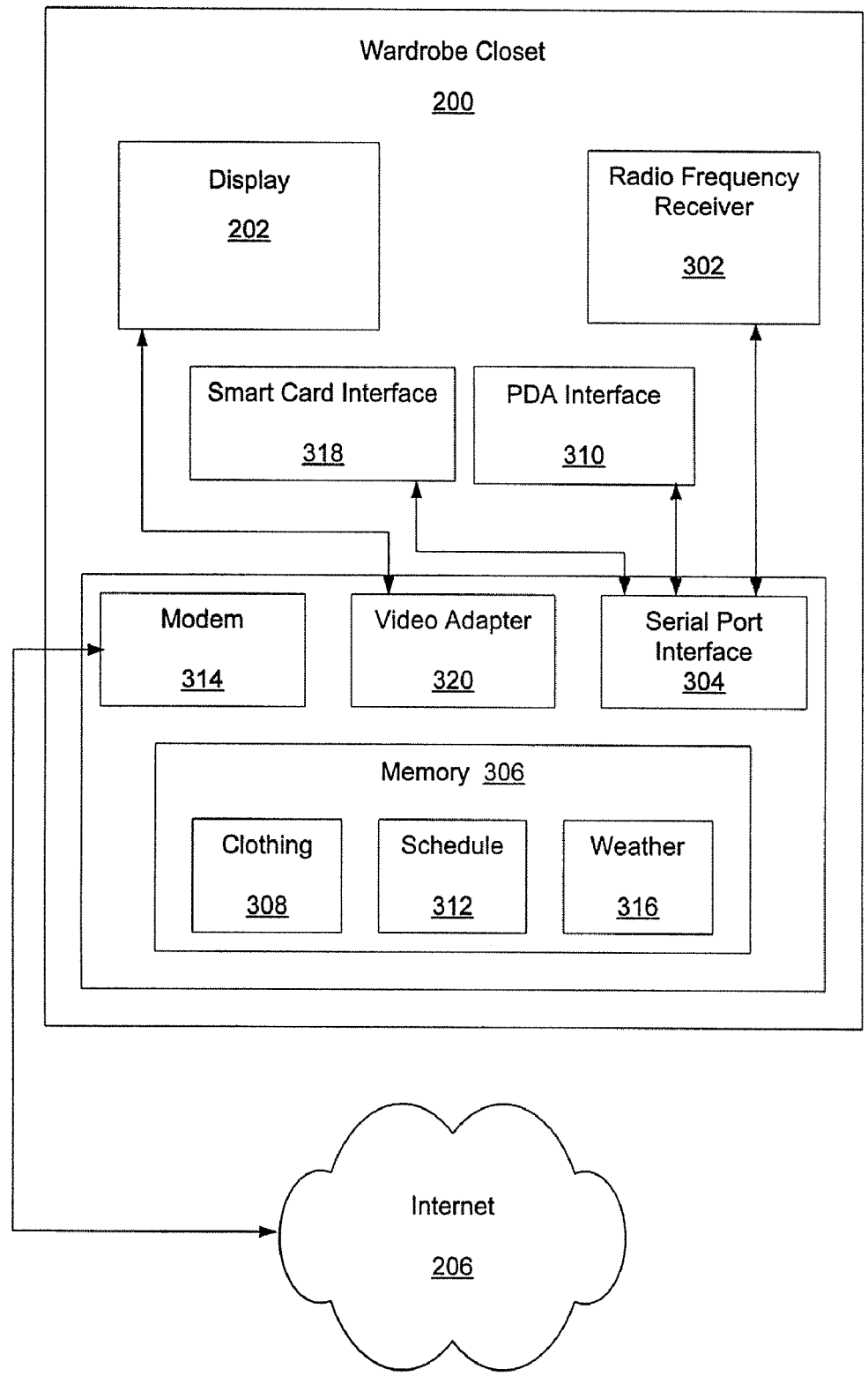
FIG. 3 is a schematic diagram of a wardrobe closet.

FIG. 3 shows a schematic diagram of a wardrobe closet in accordance with one embodiment of the invention. A radio frequency (RF) receiver 302 to may scan RF tags or sensors that are embedded in clothing. Texas Instruments manufactures suitable receivers and tags under the brand name Tag-it. The information obtained from radio frequency receiver 302 is transmitted to a serial port interface 304. Computer 204 stores information obtained from serial port interface 304 in a clothing section 308 of a memory 306. Of course, the present invention may be implemented with other tags or sensors such as Electronic Product Code (EPC) tags. Furthermore, RF receiver 302 may be replaced with a receiver operating at a different frequency, an optical reader or another reader capable of reading tags or sensors.

Wardrobe closet 200 also includes a personal digital assistant (PDA) interface 310 coupled to serial port interface 304. The user may store schedule information in a PDA and enter the information into a schedule section 312 of memory 306 via PDA interface 310. Wardrobe closet 200 also includes a modem 314 coupling computer 204 to the Internet 206. Information such as weather conditions in one or more cities may be retrieved from Internet 206 and stored in weather section 316 of memory 306. A video adapter 320 may be used to cause display 202 to display information stored in memory 306 or retrieved from the Internet 206. Additional uses for the information stored in memory 306 and information retrieved from the Internet 206 will be described below.

Wardrobe closet 200 may also include a smart card interface 318 that may be used to couple a smart card (not shown) to computer 204. A smart card may include information that identifies the user, identifies a clothing owned by the user or any of the other information to may be stored in memory 306 or in wardrobe server 208.

One skilled in the art will appreciate that the present invention can be implemented with several wardrobe closets. In one embodiment, each wardrobe closet has a separate RF receiver for identifying clothing and each of the RF receivers may be coupled to a common computer. Alternatively, each wardrobe closet may include a computer and the computers may be coupled together.

Wardrobe closets, such as wardrobe closet 200, may be distributed as promotional items. Brick & mortar store 234 or store web site 230 may provide wardrobe closets to users at reduced or no cost to the user in exchange for the user only using the wardrobe closet to shop or purchase clothing from brick & mortar store 234 or store web site 230.

Figure 4:
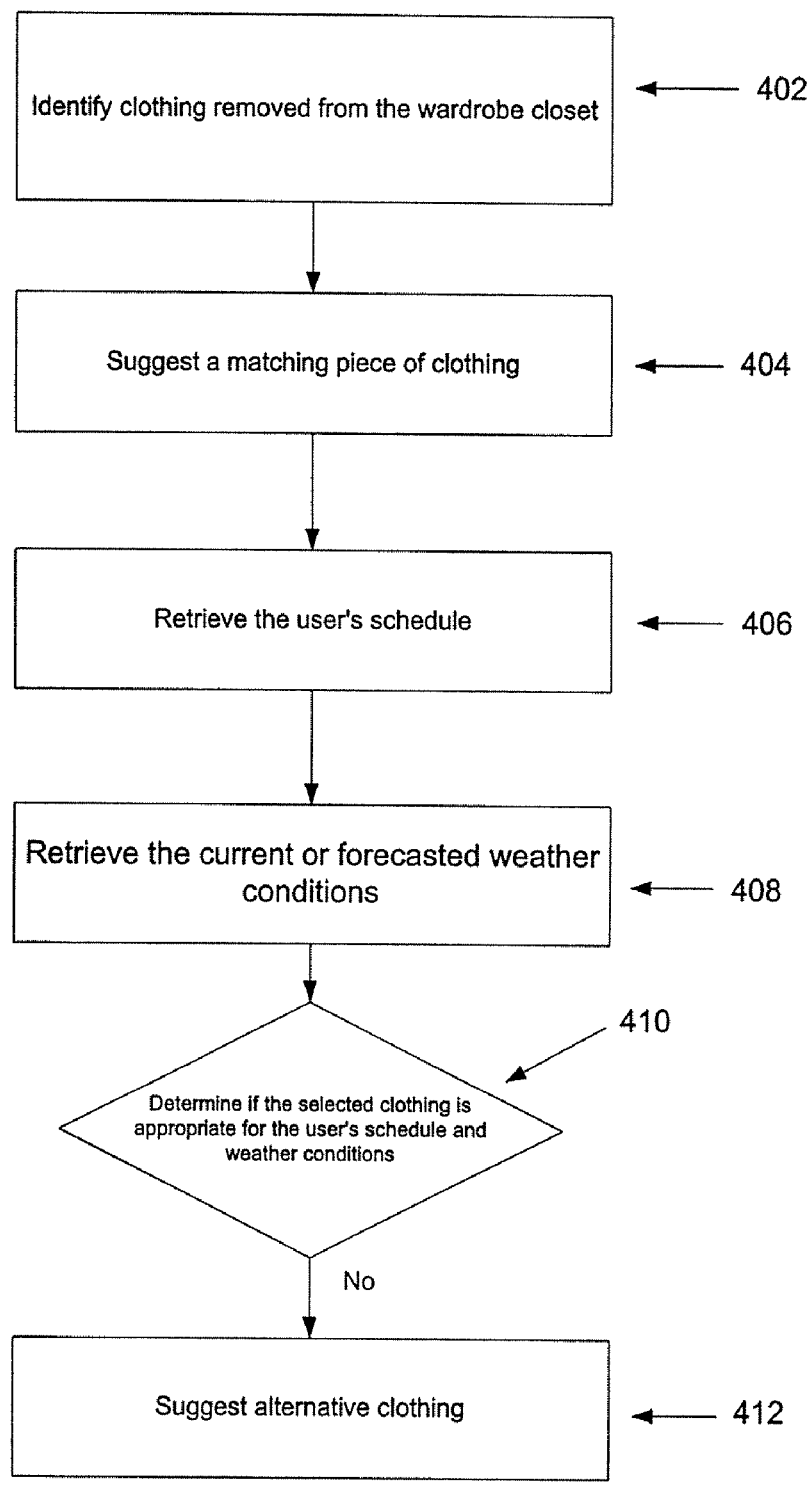
FIG. 4 illustrates a method for assisting a user in selecting clothing.

FIG. 4 illustrates a method that aids a user in the selection of clothing in accordance with one embodiment of the invention. First, in step 402, the wardrobe closet identifies clothing that has been removed by the user. RF receiver 302 (shown in FIG. 3) may scan the items of clothing stored in wardrobe closet 200. By determining the items present during two successive scans, the articles of clothing removed from the wardrobe closet may be identified.

In step 404, the wardrobe closet suggests a matching article of clothing. For example, when the user removes a shirt, the wardrobe closet may identify a matching pair of pants, shoes and a tie that form a coordinated outfit with the selected shirt. The suggestions provided by the wardrobe closet may be updated as a user removes additional articles of clothing. For example, after the user removes a shirt and a pair of pants, the wardrobe closet may determine which pair of shoes form a coordinated outfit with the selected shirt and pants. One skilled in the art will appreciate that computer 204 may include a software program for making such determinations based on factors such as style and color.

Next, in step 406, the wardrobe closet retrieves the user's schedule information. The user's schedule may be stored in a PDA, locally in memory and, in a memory connected to Internet 206 or in some other location. The current or forecasted weather conditions may also be retrieved in step 408. In one embodiment of the invention, weather information is retrieved from a web site connected to Internet 206 in a conventional manner. Computer 204 may be program to retrieve weather information that corresponds to locations identified in the user's schedule.

In step 410, the wardrobe closet determines whether the selected clothing is appropriate for the user's schedule and weather conditions. Each piece of clothing may be classified to aid in the determination. For example, a specific suit jacket may be classified to indicate that is appropriate to wear to formal meetings during the summer. In the event that the selected clothing is not appropriate for either the user's schedule or predicted weather conditions, the wardrobe closet may select alternative clothing in step 412. The selections may be display on display 202. Computer 204 may include a software program that performs steps 406-412.

Of course, there are a variety of alternative methods that wardrobe closet 200 can utilize to aid the user in the selection of clothing. For example, a group of users may be choose to allow their respective wardrobe closets to share information, such as by transmitting information over the Internet 206. Before a meeting or some other event, a user may utilize the user's wardrobe closet to determine what clothing the other users are wearing to the meeting or social event. The users may agree to remove the clothing they plan to wear from their wardrobe closet the evening before the event so that each user will know what the other users plan to wear. Wardrobe closet 200 may be programmed to alert a user when the user selects clothing that will make the user over or under dressed when compared to the other users. A user may also be alerted when the user selects clothing that is the same or similar to clothing selected by other users.

Figure 5:
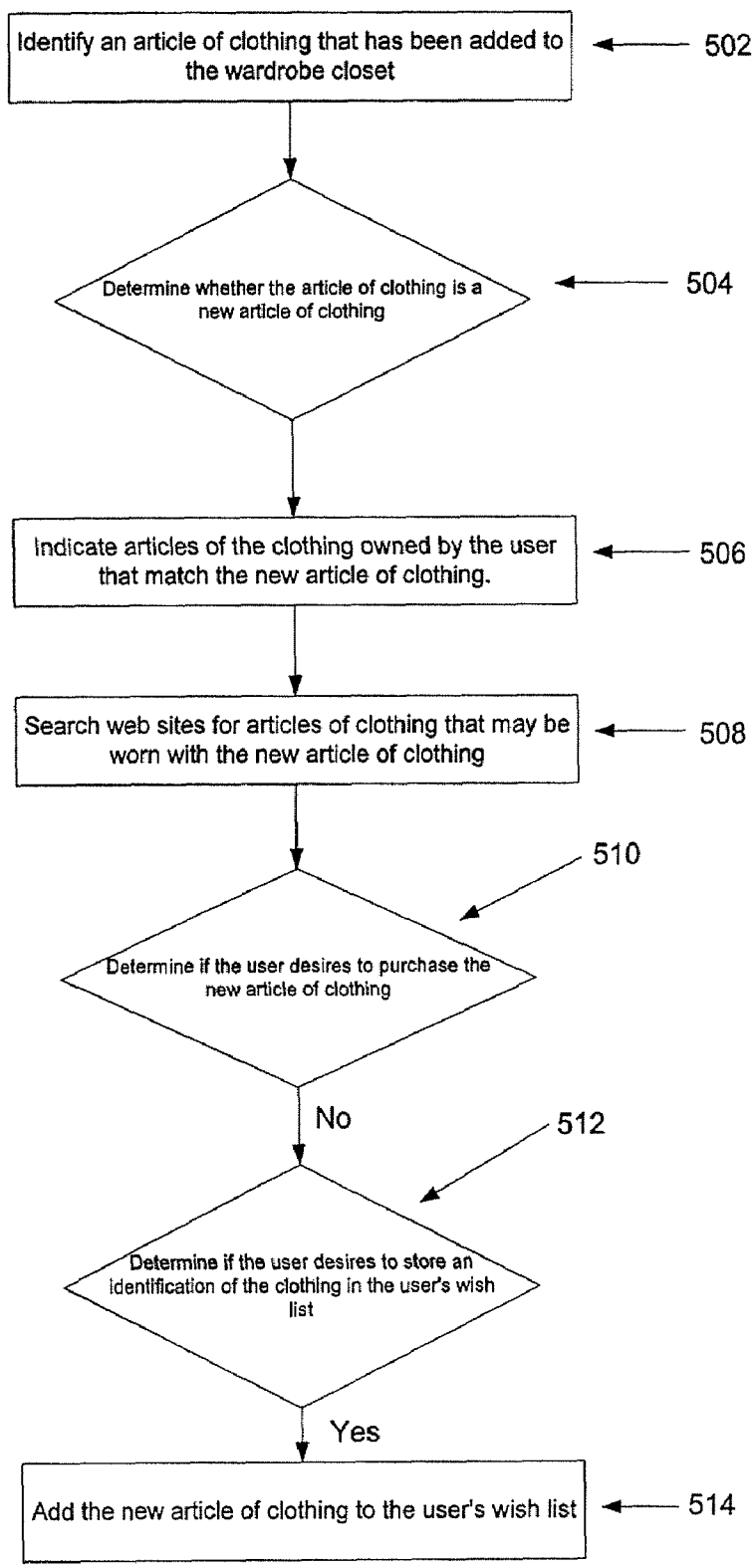
FIG. 5 illustrates a method for assisting a user in making clothing purchasing decisions.

FIG. 5 illustrates a method that may be used to assist users in purchasing clothing. In step 502, the wardrobe closet 200 identifies an article of clothing that has been added. RF receiver 302 may scan the articles of clothing to allow for the identification of clothing that has been added to the wardrobe closet in the manner described above. Next, in step 504, wardrobe closet 200 determines whether the article of clothing is a new article of clothing. This step may be performed by comparing an identification of the article of clothing to the identification of clothing stored in a memory within computer 204 or to the identification of clothing stored in clothing inventory memory 210.

If the article of clothing is identified as a new article of clothing, articles of clothing owned by the users that form coordinated outfits with the new article of clothing may be displayed on display 202 in step 506. Computer 204 may include a software program for performing this function. Additionally, in step 508, computer 204 may search web sites, such as websites 230 and 234, to locate new articles of clothing that may be of interest to the user. The search process may include utilizing the user's clothing preferences stored in memory 214 and store preferences stored in memory 218. Additional stores identified in clothing stores memory 216 may also be searched.

In step 510, the wardrobe closet determines whether or not the user wishes to purchase article of clothing produced by the search. The new clothing along with price and store information may be displayed on display 202 and the user may be prompted to indicate whether or not the user wishes to purchase the item(s). If the user does not wish to purchase the items, in step 512 the wardrobe closet determines if the user wishes to store an identification of the new clothing in the user's wish list. The user's wish list may be updated by adding an identification of the new clothing to wish list memory 220 in step 514. If the user does wish to purchase the items, the items may be directly ordered from wardrobe closet 200. Wardrobe closet 200 may transmit information such as the user's credit card information and shipping information. Information that facilitates ordering clothing may be stored in memory 306.

Figure 6:
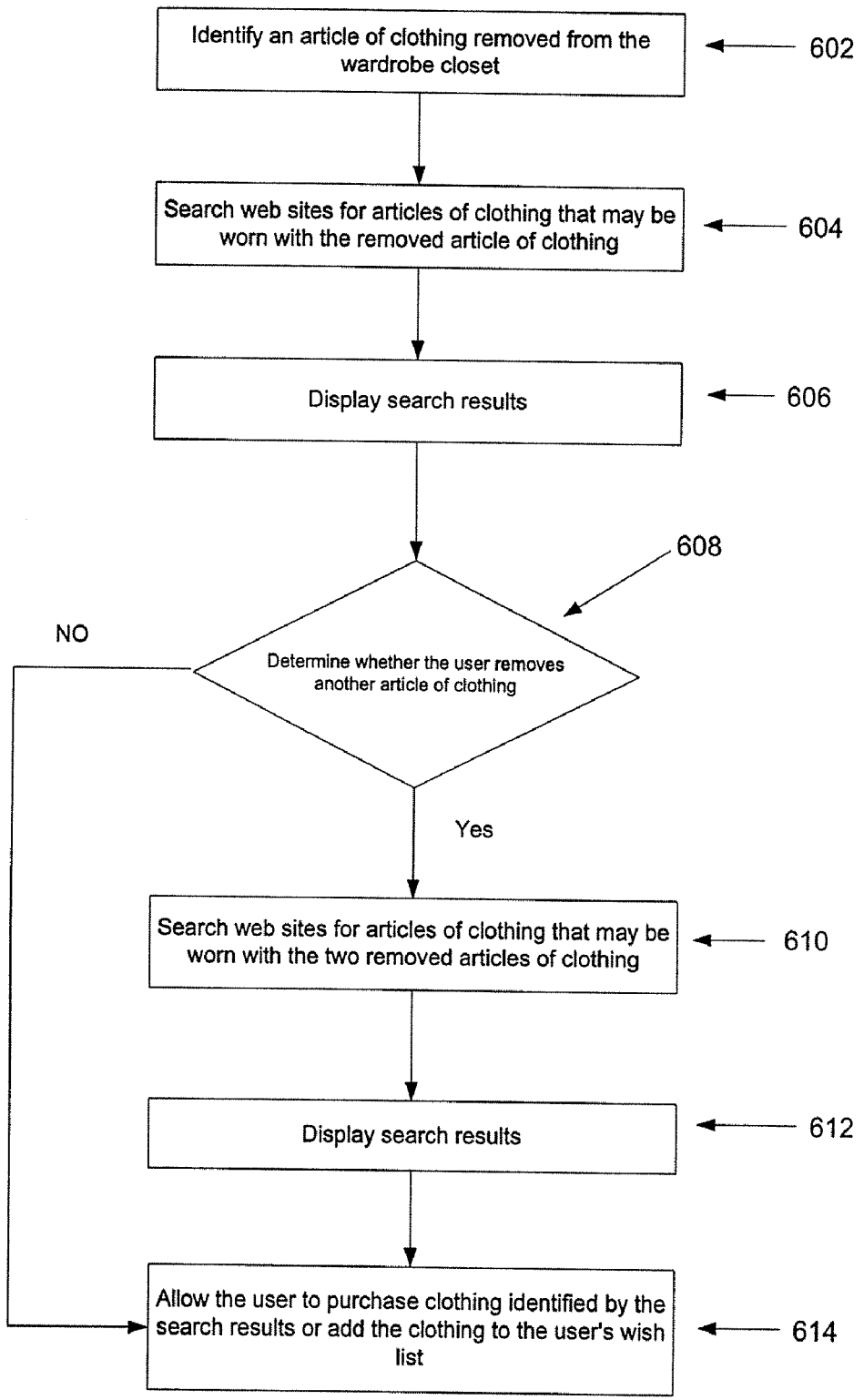
FIG. 6 illustrates a method for using a wardrobe closet to assist a user in making clothing purchasing decisions.

FIG. 6 illustrates an alternative method that may be used to assist users in purchasing clothing. First, in step 602, the wardrobe closet identifies an article of clothing that has been removed. Next, in step 604, computer 204 may search web sites, such as websites 230 and 234, to locate new articles of clothing that may form coordinated outfits with the removed article of clothing. The search results are displayed in step 606. The search results may be displayed on display 202.

The wardrobe closet then determines whether the user removes another article of clothing in step 608. If the user does not remove another article of clothing, in step 614 the user is provided with the options of purchasing items identified by the search or adding items to the user's wish list. If the user does remove another article of clothing, a new search is performed for articles of clothing that form coordinated outfits with the two removed articles of clothing in step 610. The search results may then be displayed to the user in step 612.

The method illustrated in FIG. 6 allows a user to shop for new clothing by merely removing clothing from wardrobe closet 200. For example, the user may remove a shirt and pair of pants from wardrobe closet 200 and review the search results for shoes that form a coordinated outfit with the shirt and pair of pants. Of course more than two articles of clothing may be removed from wardrobe closet 200 and the search may be narrowed and performed based on all of the articles of clothing removed from wardrobe closet 200. The search may also be broadened by replacing articles of clothing. Furthermore, a single search may be performed after all of the articles of clothing have been removed from wardrobe closet 200 instead after each article of clothing has been removed.

Figure 7:
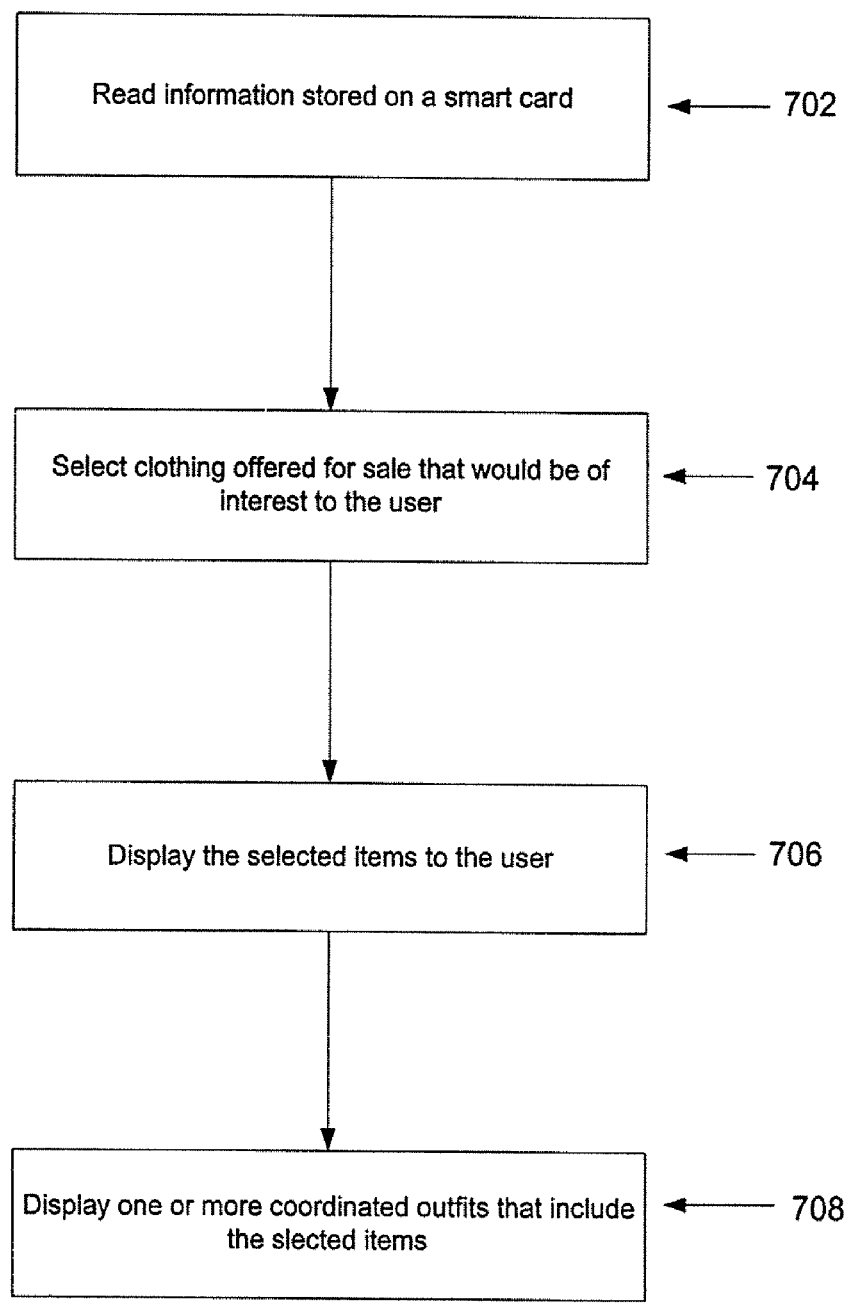
FIG. 7 illustrates a method for assisting a user in purchasing clothing at a brick and mortar store.
Figure 8:
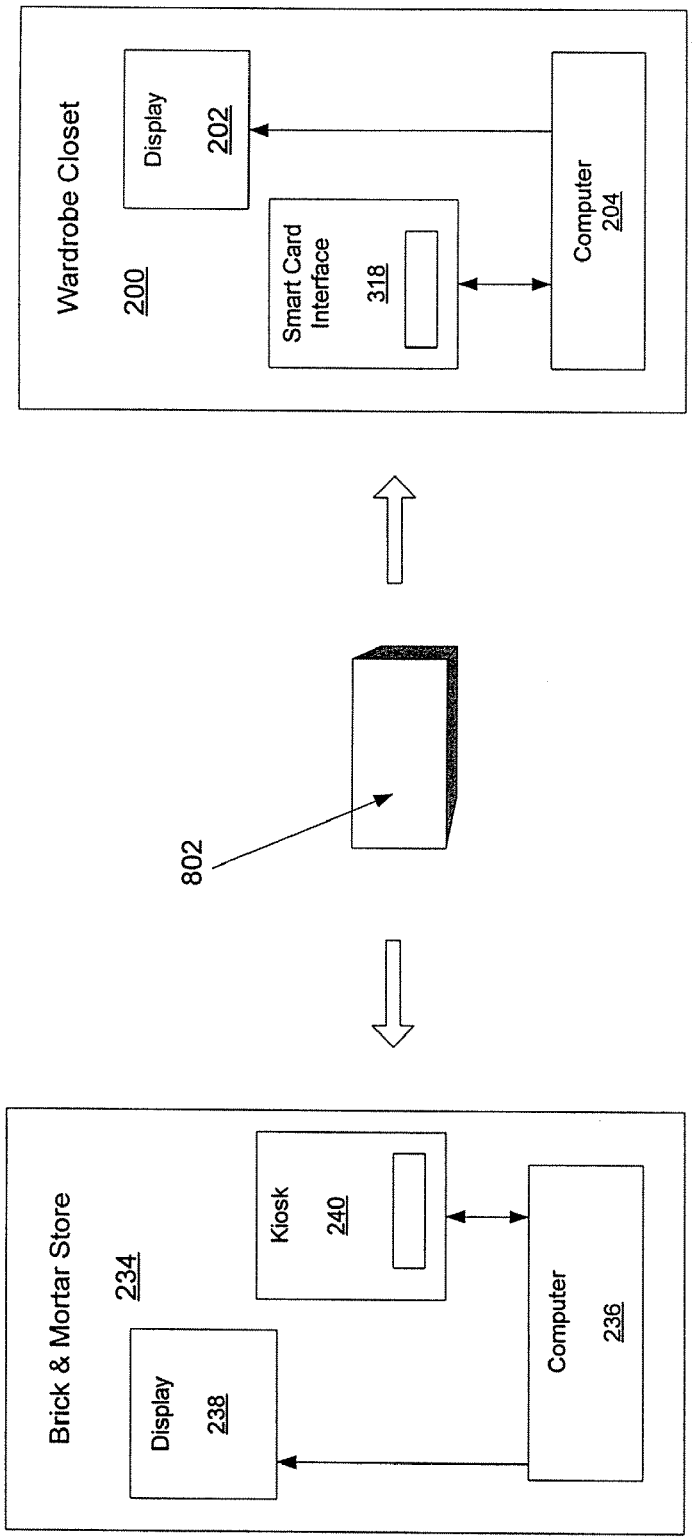
FIG. 8 is a block diagram of a system that utilizes a smart card to assist a user in making clothing purchasing decisions.

FIG. 7 illustrates a method that allows the user to use a smart card while shopping at a brick and mortar store. In step 702, the information stored on smart card is read. FIG. 8 shows an embodiment in which brick and mortar store 234 includes a kiosk 240 for reading a smart card 802. In one embodiment of the invention, information such as the information stored in wardrobe closet memory 306 and wardrobe server 208 is stored directly on smart card 802. This embodiment allows the user to essentially carry the user's wardrobe in the user's wallet and to retrieve the information stored on the smart card in a variety of different locations. Alternatively, smart card 802 may contain an identification of the user and upon entry of smart card 802 into kiosk 240, computer 236 retrieves the user's information from wardrobe closet 200 or wardrobe server 208 via the Internet 206.

Next, in step 704, clothing is selected that would be of interest to the user. Computer 236 may contain a software program that searches through the user's clothing inventory, the inventory of brick and mortar store 234 and selects clothes that the user may be interested in purchasing. For example, a software program may determine that the user does not have any shirts that form coordinated outfits with a particular pair of pants owned by the user. The program may then select such a shirt from the brick and mortar store inventory. In step 706, the selected articles of clothing are displayed to the user. The articles of clothing may be displayed on display 238 next to images of the user's existing clothing. This feature allows the user to make judgments relating to color and texture without being forced to rely and the user's memory. Finally, in step 708 one or more coordinated outfits that include the selected items may be displayed to the user.

A user may also allow other parties and trusted merchants to access the user's clothing information. For example, a husband may allow his wife to access information stored in wardrobe server 208 to facilitate shopping. In one embodiment of the invention, third parties and trusted merchants may access the user's clothing information and make suggestions on what a user should buy next. The clothing suggestions may be stored in wardrobe server 208. Furthermore, the present invention is not limited to clothing embodiments and may be extended to other areas.

While the present invention has been described in connection with the illustrated embodiments, it will be appreciated and understood that modifications may be made without departing from the true spirit and scope of the invention.

We claim:

1. A method of assisting a first user in supplementing the user's wardrobe for an event, the method comprising:
    (a) representing wardrobe information with a user wardrobe closet of the first user on a computer system, the wardrobe information being indicative of owned clothing of the first user, the wardrobe information being stored on a first computer memory electrically coupled to the computer system;
    (b) automatically identifying, by the computer system, a first article of clothing that has been removed from the user wardrobe closet of the first user from the wardrobe information by accessing the first computer memory;
    (c) retrieving, from a computer coupled to the user wardrobe closet of the first user with a computer network, the identification of a second article of clothing that forms a coordinated outfit with the first article of clothing;
    (d) storing, on a second computer memory, clothing information describing a selection of clothing by another user, the second computer memory being electrically coupled to the computer system;
    (e) receiving the clothing information from the second computer memory, the clothing information being indicative of another article of clothing that the other user plans to wear at the event;
    (f) displaying, to the first user, an identification of the second article of clothing for the first user; and
    (g) generating an alert when the second article of clothing and the first article of clothing are not in concert with the clothing information about the other article of clothing that the other user plans to wear.

2. The method of claim 1, further including:
(h) identifying a third article of clothing that has been removed from the user wardrobe closet;
(i) retrieving from a computer coupled to the user wardrobe closet with a computer network the identification of a fourth article of clothing that forms a coordinated outfit with the first and third articles of clothing; and
(j) displaying an identification of the fourth article of clothing to the first user.

3. The method of claim 1, wherein (b) comprises:
(b)(i) identifying clothing stored in the user wardrobe closet of the first user during a first time period by scanning tags attached to the clothing;
(b)(ii) identifying clothing stored in the user wardrobe closet of the first user during a second time period by scanning tags attached to the clothing; and
(b)(iii) comparing the information obtained during the first time period to the information obtained during the second time period.

4. The method of claim 1, further comprising:
(h) sharing information determined by (c) with the other user.

5. The method of claim 1, (b) comprising:
(b)(i) reading tag information included on radio sensitive tags attached to clothing;
(b)(ii) displaying the tag information to the first user; and
(b)(iii) transmitting the tag information to a wide area network.

6. The method of claim 5, further comprising:
(h) storing a schedule of appointments of the first user.

7. The method of claim 5, further comprising:
(h) exchanging tag information between the computer system and a personal digital assistant.

8. The method of claim 1, further comprising:
(h) receiving, by the coupled computer from the computer system, the wardrobe information and first article information, the first article information being indicative of the first article of clothing regarding clothing stored in the user wardrobe closet;
(i) determining the second article of clothing that is appropriate to wear with the first article of clothing from a stored data, the stored data being indicative of owned clothing of the first user, clothing preferences of the first user, clothing sizes of the first user, and a store identification of the clothing store; and
(j) sending, to the computer system, the identification of the second article of clothing.

9. The method of claim 1, (b) comprising:
(b)(i) identifying a removed article of clothing by a tag attached to the removed article of clothing;
(b)(ii) comparing characteristics of the removed article to characteristics of clothing remaining in the user wardrobe closet to identify articles of clothing that form coordinated outfits with the removed article of clothing; and
(b)(iii) displaying coordinated outfits options to the first user.

10. The method of claim 1, further comprising:
(h) identifying offered clothing for sale by a store;
(i) identifying identified clothing that may be of interest to the first user based on the wardrobe information and the offered clothing; and
(j) displaying a representation of the identified clothing to the first user.

11. The method of claim 1, further comprising:
(h) reading card information that is stored on a smart card to obtain the wardrobe information.

12. The method of claim 1, further comprising:
(h) reading a computer network address stored on a smart card; and
(i) retrieving the wardrobe information from a connected computer that is connected to the computer system at the computer network address.

13. A computer-readable medium having computer-executable instructions to perform:
(a) representing wardrobe information with a user wardrobe closet of the first user on a computer system, the wardrobe information being indicative of owned clothing of a first user, the wardrobe information being stored on a first computer memory electrically coupled to the computer system;
(b) automatically identifying, by the computer system, a first article of clothing that has been removed from the user wardrobe closet of the first user from the wardrobe information by accessing the first computer memory;
(c) retrieving, from a computer coupled to the user wardrobe closet of the first user with a computer network, the identification of a second article of clothing that forms a coordinated outfit with the first article of clothing;
(d) storing, on a second computer memory, clothing information describing a selection of clothing by another user, the second computer memory being electrically coupled to the computer system;
(e) receiving the clothing information from the second computer memory, the clothing information being indicative of another article of clothing that the other user plans to wear at an event;
(f) displaying, to the first user, an identification of the second article of clothing for the first user; and
(g) generating an alert when the second article of clothing and the first article of clothing are not in concert with the clothing information about the other article of clothing that the other user plans to wear.

14. The computer-readable medium of claim 13, further configured to perform:
(h) identifying a third article of clothing that has been removed from the user wardrobe closet;
(i) retrieving from a computer coupled to the user wardrobe closet with a computer network the identification of a fourth article of clothing that forms a coordinated outfit with the first and third articles of clothing; and
(j) displaying an identification of the fourth article of clothing to the first user.

15. The computer-readable medium of claim 13, further configured to perform:
(b)(i) identifying clothing stored in the user wardrobe closet of the first user during a first time period by scanning tags attached to the clothing;
(b)(ii) identifying clothing stored in the user wardrobe closet of the first user during a second time period by scanning tags attached to the clothing; and
(b)(iii) comparing the information obtained during the first time period to the information obtained during the second time period.

16. The computer-readable medium of claim 13, further configured to perform:
(h) sharing information determined by (c) with the other user.

17. The computer-readable medium of claim 13, further configured to perform:
(h) receiving, by the coupled computer from the computer system, the wardrobe information and first article information, the first article information being indicative of the first article of clothing regarding clothing stored in a user wardrobe closet of the first user, the wardrobe closet being associated with a clothing store;

(i) determining the second article of clothing that is appropriate to wear with the first article of clothing from a stored data, the stored data being indicative of owned clothing of the first user, clothing preferences of the first user, clothing sizes of the first user, and a store identification of the clothing store; and (j) sending, to the computer system, the identification of the second article of clothing.

18. The computer-readable medium of claim 13, further configured to perform:

(h) identifying offered clothing for sale by a store;

(i) identifying identified clothing that may be of interest to the first user based on the wardrobe information and the offered clothing; and (j) displaying a representation of the identified clothing to the first user.

19. A computer system for assisting a first user in supplementing the user's wardrobe for an event, the computer system comprising:

a first computer memory coupled to a processor and configured to store wardrobe information, the wardrobe information being indicative of owned clothing of the first user;

a second computer memory coupled to the processor; and the processor configured to:

represent wardrobe information with a user wardrobe closet of the first user;

automatically identify a first article of clothing that has been removed from the user wardrobe closet of the first user from the wardrobe information by accessing the first computer memory;

retrieve, from a computer coupled to the user wardrobe closet of the first user with a computer network, the identification of a second article of clothing that forms a coordinated outfit with the first article of clothing;

store, on the second computer memory, clothing information describing a selection of clothing by another user;

receive the clothing information from the second computer memory, the clothing information being indicative of another article of clothing that the other user plans to wear at the event;

display, to the first user, an identification of the second article of clothing for the first user; and generate an alert when the second article of clothing and the first article of clothing are not in concert with the clothing information about the other article of clothing that the other user plans to wear.

20. The computer system of claim 19, the processor further configured to:

identify a third article of clothing that has been removed from the user wardrobe closet;

retrieve from a computer coupled to the user wardrobe closet with a computer network the identification of a fourth article of clothing that forms a coordinated outfit with the first and third articles of clothing; and display an identification of the fourth article of clothing to the first user.

* * * * *